United States Patent Office 2,758,981
Patented Aug. 14, 1956

2,758,981

CORROSION PREVENTIVE COMPOSITION

Henry H. Cooke, Elizabeth, and Hugh C. De Hoff, Roselle Park, N. J., assignors to Esso Research and Engineering Company, a corporation of Delaware No Drawing. Application October 29, 1952,
Serial No. 317,566

6 Claims. (Cl. 260—23)

The present invention relates to rust and corrosion preventive compositions of a semi-solid nature that are particularly effective as coating materials for protecting metals and the like from corrosion by highly acidic substances.

Quite frequently metal equipment is subject to continual or intermittent contact with inorganic acids in vaporous or liquid form or other strongly acidic substances. Various methods have been proposed to protect the surfaces of such metals. Coating compositions such as greases, paints, slushing oils, wax compositions and the like have been used. Although such materials are frequently effective for protecting metal surfaces against moisture and mildly corrosive substances, they are generally inadequate for giving prolonged protection against strongly corrosive materials.

A good example of this problem is encountered in the conventional storage batteries used in automobiles. These batteries contain a solution of sulfuric acid as one of the principal ingredients. In order to allow for expansion and to provide a vent, the screw plugs in the battery cells have small holes in them which allow the escape of acidic vapors. These vapors come in contact with metallic parts of the battery and are a serious cause of corrosion. Frequently the acidic vapors react with lead in the battery posts and form unsightly growths of white lead sulfate. These vapors also attack terminal connections, copper cables, and the metal in the bracket and frame which hold the batteries in place. Furthermore, the batteries are subject to severe jolting and vibration when the vehicle is in operation which aggravates acid spray and corrosion. Corrosion causing failure of the supporting brackets increases the vibration and the consequent damage.

Conventional methods for protecting storage batteries include smearing the posts and terminal clamps with mineral oil or conventional cup greases, applying heavy paint compositions to terminals, and placing an oil-soaked felt washer over the post so that it is held in place by the terminal clamp. As every motorist knows, these procedures provide at most temporary and usually unsatisfactory protection. In fact it is generally a constant source of irritation to the motorist to find that bracket and frame supports have been corroded within a matter of a few months, even though he has utilized one or more of the conventional protective procedures. Mineral oils and greases give only temporary protection. Heavy paint soon cracks and disintegrates. The oil-soaked felt washer gives only local protection and is inadequate for preventing corrosion of other metallic parts.

This is only one example of materials that are subject to severe corrosion. Acid manufacturing and recovery plants, other chemical plants manufacturing or using highly corrosive substances, ore smelters and the like face similar problems. It is difficult to construct, on a commercial scale, equipment that will eliminate completely the escape of corrosive gases, vapors, and like materials, and it is not always possible to utilize corrosion resistant metals in all parts of the equipment. Conventional protective coatings frequently fail to provide adequate, long term protection for such equipment, particularly if the equipment is subject to severe vibration and weathering.

In accordance with the present invention, an improved composition is provided that is highly satisfactory for use as a semi-permanent protective coating under conditions such as those described above. The composition contemplated is a highly alkaline, substantially anhydrous mixture comprising a major proportion of a hydrocarbon base that has been thickened to a semi-solid consistency with a soap of a fatty material. Free alkalinity is provided by dispersing throughout the mixture minor proportions of a finely divided, solid inorganic compound of an alkali or alkaline earth metal, such as a hydroxide, oxide, or the like. The durability, adhesiveness, and corrosion resistant properties of the composition are further improved by the inclusion of other additives as will be described in detail hereinafter.

It has been found that this composition, because of its substantial reserve of free alkalinity, is remarkably resistant to penetration by highly acid substances for long periods of time. Because of its semi-solid, grease-like nature in combination with good plasticity, high melting point, and adhesive properties, the material provides a continuous protective coating that is resistant to the effects of vibration, weathering, and severe heat. Being substantially anhydrous, the composition cannot cause short circuits in electrical systems. The product is also quite waterproof. Since it does not dry or solidify after long periods, the material has no tendency to crack or break.

The hydrocarbon base is preferably a mineral oil product such as light mineral oil distillates, lubricant distillates, bright stocks prepared by conventional means from residua, petrolatums, paraffin waxes, and the like. Refined white mineral oils, prepared by treating mineral oil distillates with concentrated sulfuric acid using conventional procedures, are quite suitable base stocks. The mineral oil may be derived from various crude oils such as those of a naphthenic or paraffinic base. Wax-containing lubricant distillates are useful. It is usually preferred that the base stock be liquid before incorporating the other agents, however, mixtures of liquid materials containing dissolved petrolatums or waxes in desired proportions may be used to increase the stiffness and oil retention properties of the final composition, particularly if dewaxed lubricant distillates are used as the base stock. Thus, in the range of 0.5 to 15% of microcrystalline wax having a melting point up to 200° F. or higher may be included in the base stock or may be added after thickening. The viscosity of the hydrocarbon base stock is not critical but preferably ranges from about 75 to 450 S. U. S. at 100° F.

The base stock may consist of or include synthetically prepared hydrocarbons such as polymerized olefins, shale oil, and the like. Viscous mono-olefin polymers having high molecular weights such as up to about 75,000 are quite useful additives. These polymers may be obtained by catalytic polymerization of low molecular weight olefins such as ethylene, propylene, butylenes, etc. Particularly preferred are polyisobutylenes having molecular weights in the range of about 10,000 to 60,000. Thus in the range of about 0.1 to 10.0% by weight of polyisobutylene, based on the final composition, will greatly improve the adhesive properties and the viscosity-temperature coefficient of the final mixture. These and other hydrocarbons may be included in the composition to modify and improve various properties.

The soaps incorporated into the composition in order to form a semi-solid mass with a pasty consistency may be derived from various fatty materials including animal or vegetable oils, hydrogenated oils and fatty acids. The fatty acids include stearic acid, oleic acid, and the like. The fatty materials preferably have in the range of about 12 to 24 carbon atoms. The mixed fatty acids derived from hydrogenated fish oils and having in the range of 14 to 24 carbon atoms, are quite effective for use in the present invention. The above and other types of fatty materials, such as those well known in the art of grease making, are useful.

The fatty materials are present in the finished composition as a metal soap, usually of one of the alkali or alkaline earth metals. The soaps of lithium, magnesium, barium, strontium, and particularly calcium, are preferred. To make the soaps, the fatty material is preferably dissolved in the hydrocarbon base, and the alkaline material is added in the form of a hydroxide, oxide or the like in an amount sufficient to neutralize the acids. The amount of soap present in the composition is usually a minor proportion and will be sufficient to thicken the total composition to a semi-solid consistency as described heretofore. Such amounts will vary widely depending on the types of base stocks and fatty materials being used, and will generally be in the range of about 5 to 45% by weight, preferably 15 to 35% by weight, based on the finished composition.

An important feature of the present invention is the incorporation in the composition of a free alkaline material, preferably a strongly basic compound. The finished composition should contain at least 5% and usually not over 25% preferably in the range of about 10 to 20% by weight, of this material which is thoroughly dispersed and distributed throughout the composition in finely divided, solid form. The alkaline compounds useful for this purpose may be an inorganic basic reacting compound of an alkali or alkaline earth metal, such as hydroxides, oxides, carbonates, etc. or mixtures thereof. Preferably, the compounds of lithium, magnesium, calcium, barium and strontium are used from the standpoint of cheapness, availability and effectiveness. Calcium hydroxide in the form of hydrated lime is particularly useful since it is effective, safe and inexpensive. The metal constituent of the basic reacting material may be different to the one used in forming the soap of the fatty material. Preferably, however, these metals are the same from the standpoint of ease of preparation.

The composition may also contain auxiliary corrosion inhibitors, particularly to prevent or minimize the rusting of steel parts. Such materials include degras, fatty acid monoesters of sorbitan, in which the fatty acid of the ester has in the range of 8 to 30 carbon atoms, such as sorbitan mono-oleate, sodium nitrite, their mixtures and the like. These materials may be used alone or in combination in amounts in the range of about 0.1 to 15%, preferably 0.5 to 10%, by weight based on the finished composition. Degras that has been neutralized with calcium oxide for example is not only useful as an inhibitor but also makes the composition more resistant to water. Therefore any surface coated with the composition will shed water readily, and the durability of the material is increased.

The composition is also improved by including therein a small amount of an organo-silicon polymer such as the alkyl silicone polymers which are oil soluble or oil dispersable. In the range of about 0.1 to 5% by weight of such material, based on the total composition, will improve the waterproofing and penetrating properties and increase the chemical inertness of the finished composition. Such siloxane polymers having alkyl, aryl and other substituted radicals are well known in the art such as U. S. 2,446,177.

Other auxiliary agents useful in improving various properties of the composition may be included.

In preparing the composition, the fatty acid may be included in one portion of the mineral oil. The alkaline saponifying material may be introduced, preferably as a suspended solid, in another portion of the oil, in an amount sufficient to neutralize the fatty oil. The two portions may be blended together at an elevated temperature, and the mixture stirred until the fatty acids have been neutralized. The free basic reacting reagent is then incorporated as a finely divided solid in the mixture, and the remaining ingredients are then added. The composition may be passed through a colloid mill to obtain thorough dispersal of the solids throughout the mixture and to obtain an homogenized product. Upon cooling, the composition will have a heavy semi-solid texture.

The procedure is simplified if the same alkaline material is used for both soap formation and free alkalinity. In this case, an amount of alkaline compound considerably in excess of that required for soap formation is added to give the desired amount of alkaline reserve. In such case, the proportion of alkaline material may be in the range of about 3 to 10 times, or even more, the amount required to neutralize the fatty acid.

It is preferred that the composition be substantially anhydrous, i. e., contain less than about 1.0% water. Most of the small amount of water formed during the saponification step will be removed during the heating operation. Elevated temperatures such as above 200° F. may be needed in some cases to obtain a dry product if relatively large amounts of water are introduced during the preparation step.

The preparation and use of the new composition is illustrated in the following example.

EXAMPLE

A series of compositions were prepared in the following manner using a heavy mineral oil having an SUS viscosity at 100° F. of about 355 as the base stock. Hydrogenated fish oil fatty acids, containing in the range of about 14 to 24 carbon atoms and having an average molecular weight of about 259, were melted in one portion of the base stock. Hydrated lime was suspended in another portion of the base stock, the amount of lime being about 5 times the amount required to neutralize the fatty acids. The two mixtures were stirred together at about 130° to 160° F. until the fatty acids were neutralized. Other ingredients such as sodium nitrite, polyisobutylene, silicone oil, degras, sorbitan mono-oleate and microcrystalline wax were added in various combinations and amounts. The mixtures were passed through a colloid mill to obtain a thoroughly homogenized product and to disperse the solids. All of the finished compositions had a heavy, semi-solid texture on cooling.

In each case, the proportions of ingredients were varied to give final products containing about 22.8 weight per cent calcium soap and about 11.2 weight per cent free calcium hydroxide. The compositions contained less than about 1% water. The components of the compositions are shown in the following table:

Table

COMPONENTS OF COMPOSITIONS, WEIGHT PERCENT

| Composition | A | B | C | D | E |
|---|---|---|---|---|---|
| Calcium soap of hydrogenated fish oil fatty acids | 22.8 | 22.8 | 22.8 | 22.8 | 22.8 |
| Free hydrated lime | 11.2 | 11.2 | 11.2 | 11.2 | 11.2 |
| Microcrystalline paraffin wax [1] | | 5.0 | 5.0 | 5.0 | 5.0 |
| Sodium nitrite | 0.7 | | 0.7 | 0.7 | 0.7 |
| Polyisobutylene [2] | | 1.0 | 0.5 | 0.5 | 0.5 |
| Silicone oil | | | | | 1.0 |
| Sorbitan mono-oleate | | | | 5.0 | |
| Neutral degras (wool fat) | | | 5.0 | | |
| Mineral oil | 65.3 | 60.0 | 54.8 | 54.8 | 58.8 |
| Total | 100.0 | 100.0 | 100.0 | 100.0 | 100.0 |

[1] Melting point—170° to 175° F.
[2] Average molecular weight—14,500.

A series of tests were carried out in which the above compositions were applied to the batteries of nine different automobiles. The battery posts, terminals and holding mechanism were cleaned with a stiff brush and a strong solution of sodium carbonate in water. After drying, the protective coating was applied with a rag to all metallic surfaces where corrosion usually occurs. The supporting brackets and battery holding mechanisms were also completely coated.

It was found that the compositions of the present invention gave complete protection against corrosion and rusting for periods as long as 12 months, eliminated the formation of lead sulfate deposits, and stayed in place for these long periods without melting, drying, breaking or otherwise exposing covered metal parts.

In contrast, automobile batteries and auxiliary metal parts having no protective coating of any kind generally start showing signs of rusting within several weeks. Comparative tests were also carried out in which batteries and metal parts were coated with conventional cup greases having less than about 1% excess alkalinity. These greases gave fair protection for several months at most. Generally it was necessary to apply additional coatings at rather frequent intervals since the usual greases are removed or lost by weathering, melting, vibration, etc.

The compositions of the present invention are ideal for use at service stations and by individual automobile owners. They are conveniently packaged and readily applied. Furthermore, they are relatively easy to handle and safe to use, particularly if the free alkaline material is one of the less irritating compounds such as lime, lithium hydroxide, sodium carbonate, etc. The compositions have broad application, however, as protective coatings, slushing compositions and the like for many different types of metal equipment that are exposed to severe corrosive influences.

What is claimed is:

1. A substantially anhydrous corrosion preventive composition consisting essentially of a mineral lubricant base stock thickened to a semi-solid, grease-like consistency with a calcium soap of hydrogenated fish oil fatty acids having in the range of about 14 to 24 carbon atoms, said soap being present in an amount in the range of about 5 to 45% by weight, calcium hydroxide dispersed throughout said composition as a finely divided solid in an amount in the range of about 10 to 20% by weight, in the range of 0.1 to 10% by weight of a polymer of isobutylene having a molecular weight of about 10,000 to 60,000, and in the range of 0.5 to 15% of a microcrystalline paraffin wax.

2. A composition as in claim 1 wherein said composition contains in the range of about 0.1 to 15% by weight of a corrosion inhibitor.

3. A composition as in claim 2 wherein said composition includes about 0.1 to 5% by weight of an organosilicon polymer.

4. A composition as in claim 2 wherein said corrosion inhibitor is neutral degras.

5. A composition as in claim 2 wherein said corrosion inhibitor is sorbitan mono-oleate.

6. A composition as in claim 2 wherein said corrosion inhibitor is sodium nitrite.

References Cited in the file of this patent

UNITED STATES PATENTS

| | | |
|---|---|---|
| 1,558,589 | Canute | Oct. 27, 1925 |
| 1,562,489 | Bass | Nov. 24, 1925 |
| 1,578,494 | Wolff | Mar. 30, 1926 |
| 2,182,992 | Lebo | Dec. 12, 1939 |
| 2,189,873 | Zimmer et al. | Feb. 13, 1940 |
| 2,409,950 | Meyer | Oct. 22, 1946 |
| 2,446,177 | Hain et al. | Aug. 3, 1948 |
| 2,450,321 | White et al. | Sept. 28, 1948 |
| 2,462,970 | Holtzclaw | Mar. 1, 1949 |
| 2,509,599 | Hollenberg | May 30, 1950 |
| 2,566,068 | Morgan et al. | Aug. 28, 1951 |
| 2,580,036 | Matuszak et al. | Dec. 25, 1951 |
| 2,583,606 | Sirianni et al. | Jan. 29, 1952 |
| 2,584,085 | Stross | Jan. 29, 1952 |
| 2,595,158 | McCue et al. | Apr. 29, 1952 |